United States Patent
Yatsuzuka et al.

(10) Patent No.: US 6,976,360 B1
(45) Date of Patent: Dec. 20, 2005

(54) STEAM ENGINE

(75) Inventors: Shinichi Yatsuzuka, Chiryu (JP);
Shuzo Oda, Kariya (JP); Katsuya Komaki, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/070,407

(22) Filed: Mar. 1, 2005

(30) Foreign Application Priority Data

Mar. 5, 2004 (JP) .............................. 2004-062501

(51) Int. Cl.⁷ ........................................... F01K 13/00
(52) U.S. Cl. ........................................ 60/645; 60/659
(58) Field of Search ........................ 60/643, 645, 659, 60/670

(56) References Cited

U.S. PATENT DOCUMENTS

| | | | | |
|---|---|---|---|---|
| 4,642,988 A | * | 2/1987 | Benson | 60/641.14 |
| 4,663,938 A | * | 5/1987 | Colgate | 60/620 |
| 4,719,968 A | * | 1/1988 | Speros | 165/154 |
| 4,816,121 A | * | 3/1989 | Keefer | 204/156 |
| 2004/0060294 A1 | | 4/2004 | Yatsuzuka et al. | |

FOREIGN PATENT DOCUMENTS

JP          58-57014          4/1983

* cited by examiner

Primary Examiner—Hoang Nguyen
(74) Attorney, Agent, or Firm—Harness, Dickey & Pierce, PLC

(57) ABSTRACT

A steam engine has a fluid container, a heating device and a cooling device provided at the fluid container for heating and cooling working fluid filled in the fluid container, so that a part of the working fluid is heated and vaporized to move the liquid-phase working fluid in one direction. When the vaporized steam is cooled and liquidized, the pressure of the working fluid in the fluid container is decreased, to thereby move the liquid-phase working fluid in the backward direction. Kinetic energy is thereby generated by using the back and forth movement of the working fluid. The heating device has multiple through-holes, through which the working fluid flows and heated by a heating surface (an inner surface of the through-holes) of the heating device, wherein a diameter "d" of the through-hole is made almost equal to or smaller than a depth of heat penetration "δ", which is determined by the following formula:

$$\delta = \sqrt{2a/\omega}$$

wherein "a" is a heat diffusivity of the working fluid, and "ω" is an angular frequency of the working fluid during the working fluid is periodically moved back and forth.

9 Claims, 5 Drawing Sheets

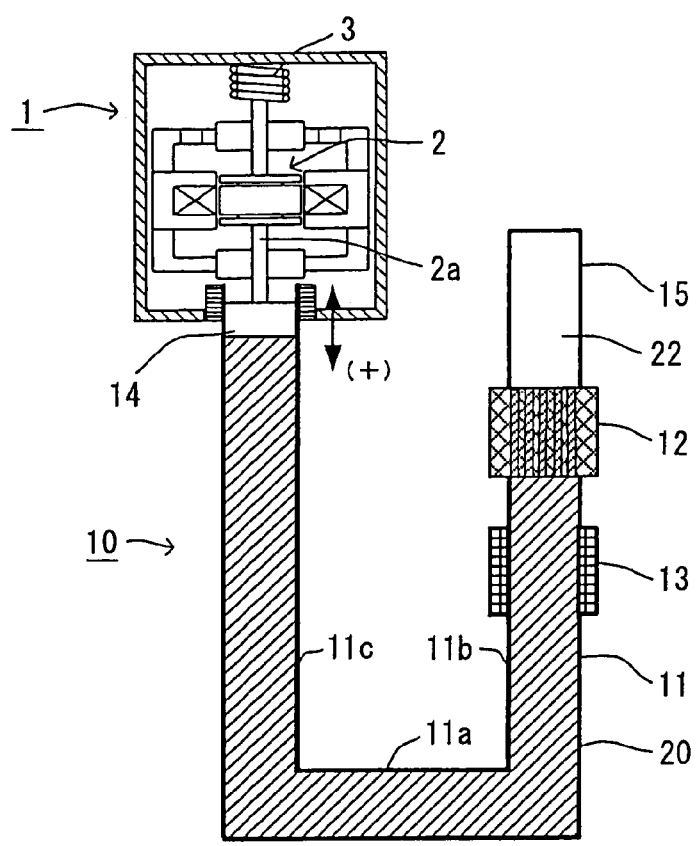
FIG. 1
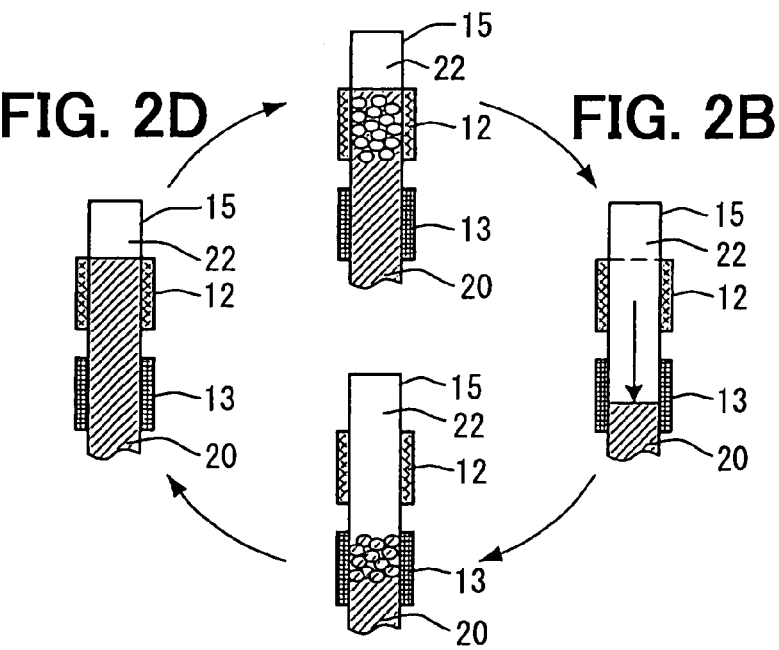
FIG. 2A
FIG. 2B
FIG. 2C
FIG. 2D
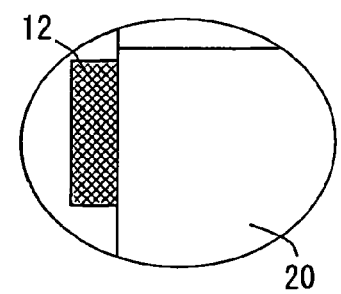
FIG. 2E
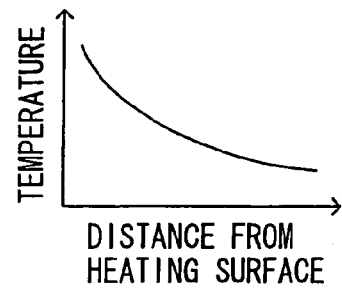
FIG. 2F

STEAM ENGINE

CROSS REFERENCE TO RELATED APPLICATION

This application is based on Japanese Patent Application No. 2004-062501 filed on Mar. 5, 2004, the disclosure of which is incorporated herein by reference.

1. Field of the Invention

The present invention relates to a steam engine for converting heat energy into kinetic energy.

2. Background of the Invention

A steam engine is known in the art, for example as disclosed in Japanese Patent Publication No. S58-57014. In the conventional steam engine as above, a working fluid is filled into a fluid container, the fluid is heated and vaporized by a heating device, and the vaporized steam is then cooled and condensed to change a pressure in the fluid container, so that kinetic energy is obtained by the pressure change in the fluid container.

In the above conventional steam engine, pistons or the like in the fluid container are moved by the steam generated by the heating device, to generate the kinetic energy. The related parts or elements, such as the pistons, which are opposed to the high-temperature and high-pressure steam, are likely to be deteriorated.

The inventors of the present invention, then, proposed a steam engine, in which a working fluid is filled into a fluid container and kinetic energy is obtained by heating and cooling the fluid, the working fluid is moved in the fluid container by expansion pressure of the vaporized steam and related mechanical parts (such as the pistons) are driven by the fluid (liquid) movement (this is referred to as "liquid piston") to generate the kinetic energy, instead of opposing the related mechanical parts (such as the pistons) to the steam generated in the fluid container as in the conventional steam engine.

According to such an arrangement, the related mechanical parts are moved (displaced) upon receiving the pressure of the working fluid (liquid) which is not heated. The mechanical parts are less likely to be deteriorated than the conventional steam engine, and the durability of the steam engine can be improved.

According to the above proposed steam engine, however, it is necessary to heat, by the heating device, the working fluid flowing (moving back and forth) in the fluid container to generate the steam. And thereby, it is disadvantageous in that a heat loss would become large in the heating device.

Namely, the heating device is arranged around a fluid passage, through which the working fluid flows, to heat the working fluid. In such a heating device, temperature at a position closer to the heating device is higher, and the temperature becomes lower at a position away from the heating device. Accordingly, the working fluid is heated and separated into two groups, one of which is "the working fluid which is vaporized and becomes high-pressure steam" and the other is "the working fluid which is warmed without being vaporized and moves towards a cooling device". As a result, since the latter working fluid is cooled down by the cooling down without contributing in generation of the kinetic energy, the large heat loss may occur in such steam engine.

SUMMARY OF THE INVENTION

It is, therefore, an object of the present invention, in view of the above mentioned problems, to provide a steam engine in which a working fluid is filled into a fluid container and kinetic energy is obtained by moving (back and forth) the working fluid in the fluid container as a result of heating and cooling the fluid, so that an efficiency of generating the steam by a heating device is improved and heat loss is reduced.

According to a feature of the present invention, a steam engine has a liquid container in which working fluid is filled, and a heating device and a cooling device respectively provided at the fluid container for heating and cooling the working fluid, wherein the working fluid is heated and vaporized by the heating device to move the liquid-phase working fluid in one direction in the fluid container, and vaporized steam of the working fluid is cooled by the cooling device to move the liquid-phase working fluid in the opposite direction. The working fluid is periodically moved back and forth in the fluid container by heating and cooling the working fluid. Kinetic energy is thereby generated by using the back and forth movement of the working fluid in the fluid container.

The heating device has a flow passage formed by a heating surface (an inner surface of the flow passage), through which the working fluid flows and the working fluid is heated by the heating surface of the heating device. A diameter of the flow passage is made almost equal to or smaller than a depth of heat penetration "δ", which is determined by the following formula:

$$\delta = \sqrt{2a/\omega}$$

wherein, a" is a heat diffusivity of the working fluid, and
"ω" is an angular frequency of the working fluid during the working fluid is periodically moved back and forth According to the steam engine designed as above, almost all of the working fluid flowing into the flow passage can be vaporized, and thereby the (liquid-phase) working fluid entering into the flow passage of the heating device is prevented from flowing toward the cooling device after having absorbed heat (without being vaporized) from the heating device. As a result, heat loss caused by the working fluid, which has not been vaporized at the heating device, can be reduced and the steam engine having a high efficiency can be realized.

According to another feature of the invention, the flow passage of the heating device is formed of multiple through-holes, through which the working fluid flows, and a diameter of each through-hole is made almost equal to or smaller than a depth of heat penetration "δ". According to such an arrangement, a time for heating and vaporizing the working fluid can be reduced.

According to a further feature of the present invention, the heating device is arranged at a vertically higher position than the cooling device. According to such an arrangement, the vaporized steam generated by the heating device pushes down a liquid surface (which is a boundary between the vaporized steam and the liquid-phase working fluid) toward the cooling device, and the steam reaching the cooling device is cooled and condensed. Accordingly, the working fluid moves in the fluid container in a back and forth direction (in an upward and downward direction) with a self-excited vibration. Furthermore, a time for heat exchange between the working fluid and the heating device or the cooling device can be made longer, to thereby improve an operational efficiency of the steam engine.

According to a still further feature of the present invention, a gas is filled in the fluid container as a vibration generating means for periodically applying a vibrating force (a compressive reaction force) to the working fluid, so that the operational efficiency of the steam engine can be further improved.

BRIEF DESCRIPTION OF THE DRAWINGS

The above and other objects, features and advantages of the present invention will become more apparent from the following detailed description made with reference to the accompanying drawings. In the drawings:

FIG. 1 is a schematic view showing a steam engine according to a first embodiment of the present invention;

FIGS. 2A to 2D are explanatory views for explaining an operation of the steam engine according to the first embodiment;

FIG. 2E is an enlarged cross sectional view of a portion of a heating device and a fluid container showing a temperature distribution;

FIG. 2F is a graph showing the above temperature distribution of FIG. 2E;

Figure 3A:
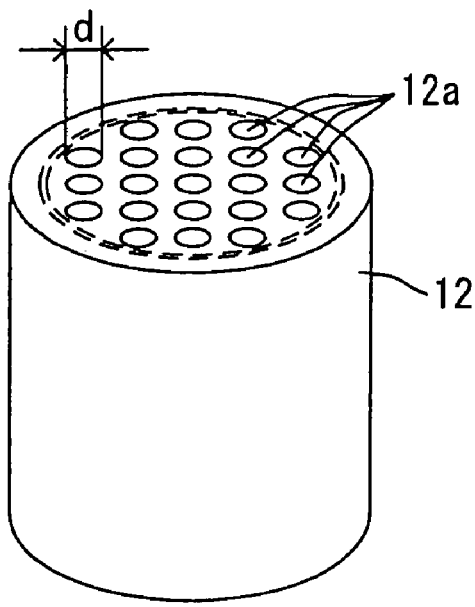
FIG. 3A is a schematic perspective view of a heating device of the first embodiment.

DETAILED DESCRIPTION OF THE PREFERRED EMBODIMENTS (First Embodiment)

A first embodiment of the present invention will now be explained with reference to the drawings.

In the first embodiment, a steam engine is applied to a linear motor for displacing a moving element 2 in an electric power generator 1. FIG. 1 is a schematic view showing the steam engine 10 and the electric power generator 1 according to a first embodiment of the present invention.

The electric power generator 1 is a linear vibration actuator for generating electromotive force by displacing the moving element 2, in which a permanent magnet is embedded.

As shown in FIG. 1, the steam engine 10 has a fluid container 11 in which working fluid 20 is filled and the working fluid 20 can freely move (flow) therein, a heating device 12 for heating the fluid in the fluid container 11, and a cooling device 13 for cooling steam heated and vaporized by the heating device 12.

The fluid container 11 is preferably made of a heat insulating material, except for those parts opposed to the heating device 12 and the cooling device 13. Since the working fluid 20 is water in this embodiment, the fluid container 11 is made of a stainless steel, while those parts opposed to the heating device 12 and the cooling device 13 are made of copper or aluminum, which has a higher thermal conductivity.

The fluid container 11 is formed into a U-shaped pipe container having a bent pipe portion 11a at its bottom and a first and a second straight pipe portions 11b and 11c vertically extending from the bent pipe portion 11a.

The first straight pipe portion 11b is provided with the heating device 12 and the cooling device 13, wherein the heating device 12 is arranged at a vertically higher position than the cooling device 13. An upper end of the first straight pipe portion 11b is closed to form a gas chamber 15, into which inert gas which does not react with the working fluid 20, such as nitrogen, helium or the like, is filled. The inert gas in the gas chamber 15 operates as a vibration generating means.

A piston 14 is provided at an upper portion of the second straight pipe portion 11c, wherein the piston 14 is moved (displaced) in a vertical direction in accordance with pressure of the working fluid 20.

The piston 14 is connected to a shaft 2a of the moving element 2 of the generator 1. A spring 3 is provided in the generator 1 on an opposite side of the piston 14 for biasing the moving element 2 toward the piston 14.

In the steam engine 10 as described above, the working fluid (water) 20 in the straight pipe portion 11b adjacent to the inert gas 22 and the heating device 12 is heated and vaporized by the heating device 12 (an isothermal expansion), as shown in FIG. 2A, when the heating device 12 and the cooling device 13 are operated. And thereby, a liquid surface in the straight pipe portion 11b is pushed down, as shown in FIG. 2B. As a result, the liquid working fluid in the fluid container 11 flows from the first (11b) to the second straight pipe portion 11c to push up the piston 14 of the generator 1.

When the liquid surface of the working fluid in the straight pipe portion 11b comes down to the cooling device 13, and the steam enters in an area of the cooling device 13, the vaporized steam is cooled down and liquidized by the cooling device 13, as shown in FIG. 2C, and the pressure for pushing down the liquid surface disappears (an isothermal compression to adiabatic compression), and finally the liquid surface in the straight pipe portion 11b goes up, as shown in FIG. 2D. As a result, the piston 14 of the generator 1, which has been once lifted up by the expansion of the steam, is moved down.

The above operation is repeated until the operations of the heating device 12 and the cooling device 13 are stopped. During the above operation, therefore, the working fluid 20 in the fluid container 11 (in the second straight pipe portion 11c) is periodically moved up and down (self-excited vibration), to thereby move up and down the moving element 2 of the generator 1.

According to the steam engine 10 of the above embodiment, since the generator 1 is operated, wherein the piston 14 is not opposed to the high-temperature and high-pressure steam, durability of the steam engine 10 can be improved.

When the working fluid 20 is heated by the heating device 12, wherein the heating device 12 is arranged around the straight pipe portion 11b of the fluid container 11 and the working fluid is heated from the outside of the pipe portion, a temperature gradient in the working fluid occurs as shown in FIG. 2E. As shown in FIG. 2F, the temperature of the working fluid 20 becomes lower as a distance from a heating surface becomes larger. Accordingly, it may happen that all of the working fluid is not always vaporized and a part of the working fluid warmed by the heating device 12 moves toward the cooling device 13 without being vaporized.

According to the embodiment, therefore, the heating device 12 is composed of a cylindrical body having multiple through-holes 12a forming a flow passage, through which the working fluid flows, as shown in FIG. 3A. The flow passage (the multiple through-holes 12a) is formed by a heating surface (an inner surface of the flow passage). The heating device 12 is provided between the cooling device 13 and the gas chamber 15, and thereby the working fluid 20 is efficiently heated by the heating device 12.

According to the embodiment, a diameter "d" of the respective through-holes 12a is designed to satisfy the following mathematical formula (1), in order to prevent that the working fluid warmed by the heating device 12 moves toward the cooling device 13 without being vaporized:

$$\delta = \sqrt{2a/\omega} \tag{1}$$

wherein "δ" is a depth of heat penetration,

"a" indicates a heat diffusivity, and

"ω" indicates an angular frequency of the working fluid during the working fluid is moved back and forth (namely, when the working fluid is periodically moved back and forth in the through-holes 12a).

According to the steam engine 10 of the present invention, all of the liquid-phase working fluid 20 flowing through the through-holes 12a of the heating device 12 can be vaporized, and thereby the liquid-phase working fluid entering into a heating portion of the heating device 12 is prevented from flowing toward the cooling device 13 after having absorbed heat (without being vaporized) from the heating device 12.

As a result, heat loss caused by the working fluid 20, which has not been vaporized at the heating device 12, can be reduced and the steam engine having a high efficiency can be realized.

The depth of heat penetration "δ" is determined, as understood from the above mathematical formula (1), by the heat diffusivity "a" [$m^2$/sec] of the working fluid 20 (water in this embodiment) and the angular frequency "ω" [rad/sec] representing characteristic of the fluid movement (fluid displacement) (i.e. a characteristic of the movement of the piston 14 in the up-down direction) of the working fluid in the fluid container 11.

In the case that the depth "d" of the through-holes 12a is made equal to the value "δ" of the depth of heat penetration, the working fluid 20 can be most effectively vaporized by the heating device 12.

Figure 3B:
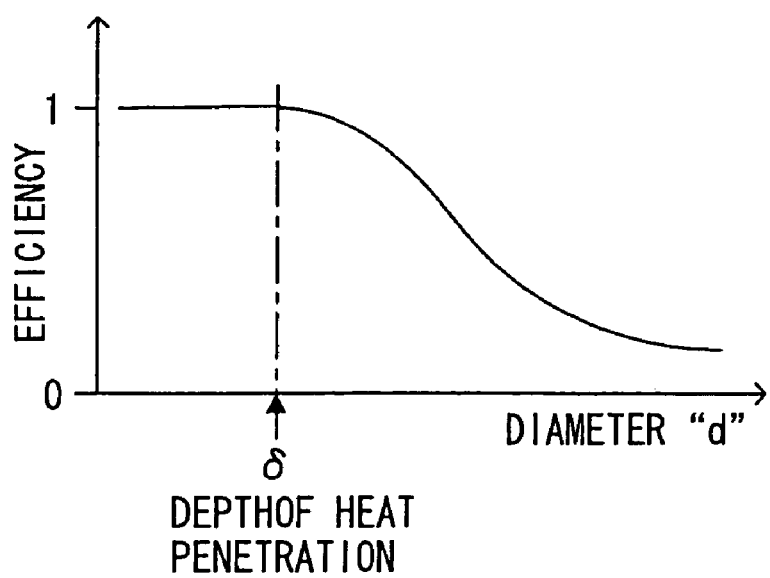
FIG. 3B is a graph showing a relation between an efficiency of vaporization and a diameter of flow passage.

As shown in FIG. 3B, the working fluid 20 can be sufficiently vaporized, even if the diameter "d" of the through-holes 12a becomes larger, by a small amount, than the depth of heat penetration "δ". On the other hand, if the diameter "d" of the through-holes 12a is made smaller than the depth of heat penetration "δ", the working fluid 20 can be 100% vaporized (the efficiency is "1" in FIG. 3B).

Accordingly, the diameter "d" of the through-holes 12a is not necessarily made equal to the depth of heat penetration "δ", but the diameter "d" can be made nearly equal to and smaller than the depth of heat penetration "δ".

(Second Embodiment)

Figure 4:
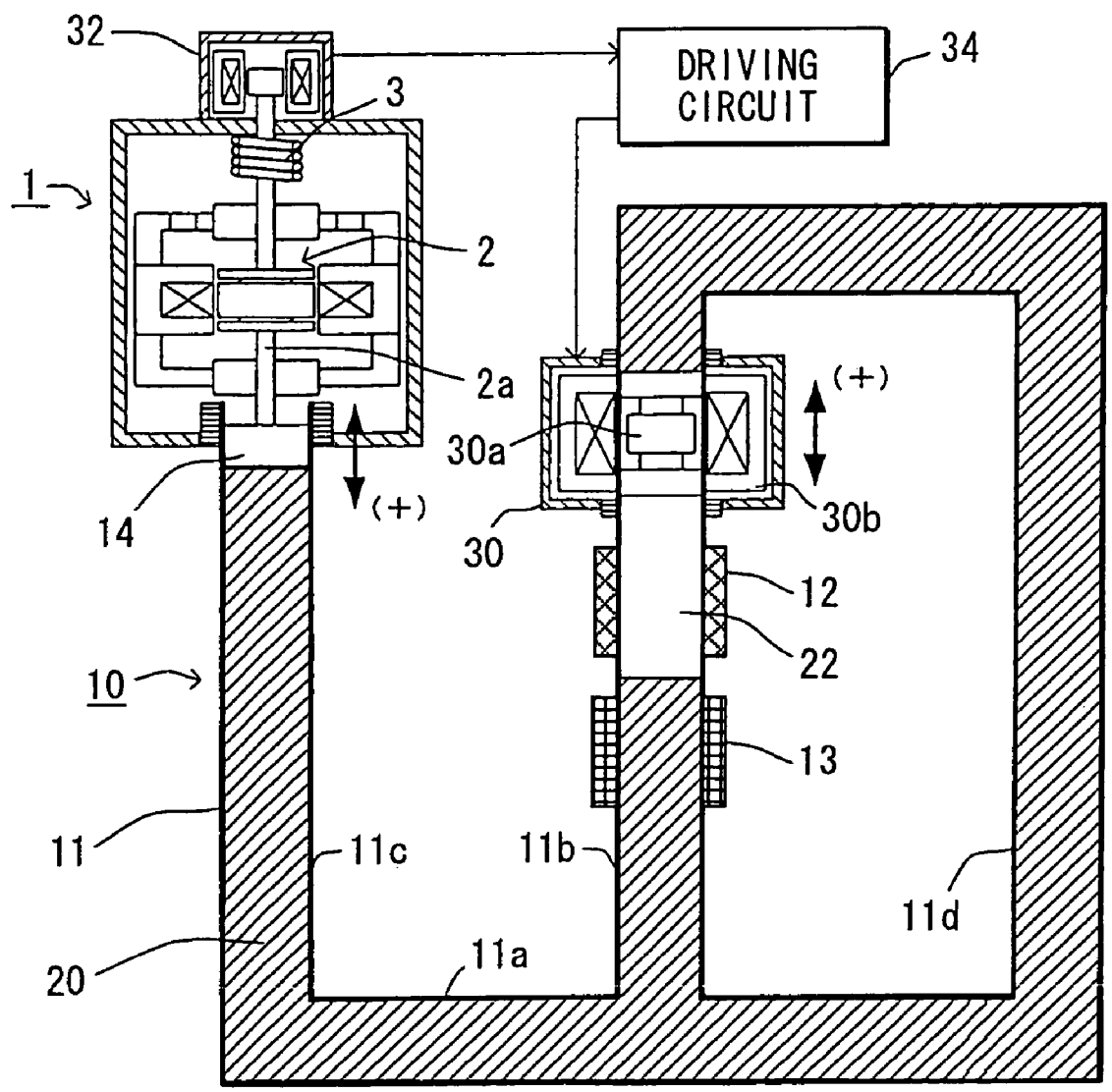
FIG. 4 is a schematic view showing a steam engine according to a second embodiment of the present invention.

A second embodiment of the present invention is explained with reference to FIG. 4, showing a schematic view of a power generating apparatus according to the second embodiment of the present invention.

As shown in FIG. 4, the power generating apparatus comprises the electric power generator 1 and the steam engine 10, as in the same manner to the first embodiment, wherein the second embodiment differs from the first embodiment in that another pipe portion 11d is added to the first pipe portion 11b to form a circular pipe portion, a displacer 30 is provided above the heating device 12, an inert gas 22 is filled in the pipe portion below the displacer 30, the working fluid 20 is also filled in the other pipe portion 11d, and the displacer 30 is operated by a driving circuit 34.

The displacer 30 comprises a movable element 30a for closing an inside fluid passage of the circular pipe portion (11b, 11d) at a position above the heating device 12, and an actuator 30b for moving (displacing) the movable element 30a along the inside fluid passage of the circular pipe portion 11b and 11d.

An operation of the second embodiment will be explained with reference to FIGS. 5A and 5B.

Figure 5A:
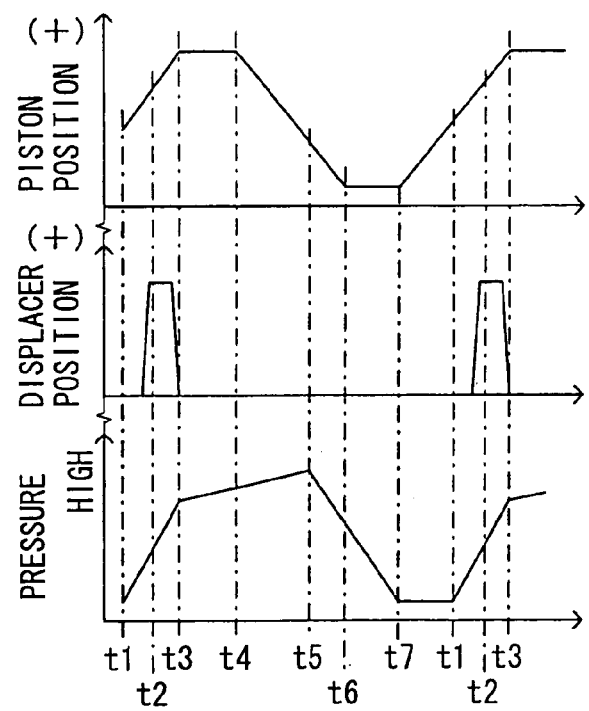
FIGS. 5A and 5B are explanatory graph and views for explaining an operation of the steam engine according to the second embodiment.

FIG. 5A shows position changes of the piston 14 and the movable element 30a of the displacer 30, and shows the pressure changes of the working fluid with respect to respective time changes from t1 to t7.

Reference signs "+" in FIG. 5A respectively correspond to the reference signs in FIG. 4, namely the respective moving directions of the piston 14 and the movable element 30a. The reference sign "+" for the piston 14 indicates the movement of the piston 14 in the downward direction, whereas the reference sign "+" for the movable element 30a indicates the movement of the movable element 30a in the upward direction.

Figure 5B:
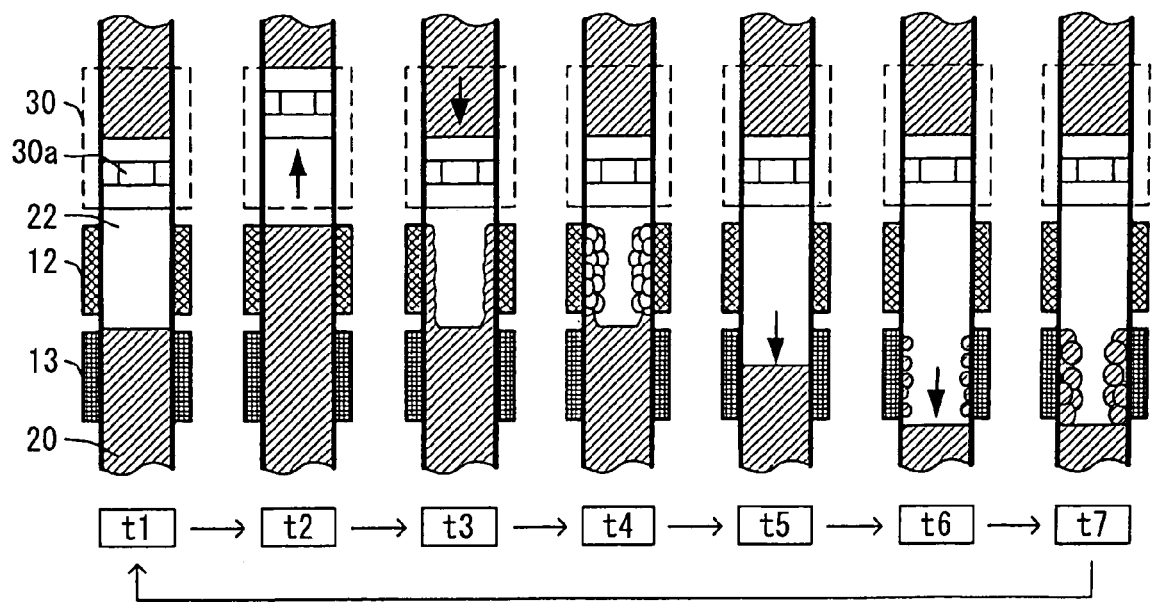

The movable element 30a is positioned at such a position, as shown at a timing t1 of FIG. 5B, at which the liquid surface of the working fluid (i.e. the liquid-phase working fluid is opposed to the inert gas 22) is controlled between the heating device 12 and the cooling device 13, during a normal operation. The movable element 30a is lifted up only during the actuator 30b is energized by the driving circuit 34, so that the liquid surface of the working fluid 20 is thereby moved up to the heating device 12, as shown at a timing t2 of FIG. 5B.

According to the embodiment, when the heating device 12 as well as the cooling device 13 is operated, and further the displacer 30 is temporarily actuated by the driving circuit 34 to lift the movable element 30a up, the liquid-phase working fluid 20 moves up to the heating device 12 and liquid film of the working fluid 20 is formed at inner surface (heating surface) of the heating device 12, as shown at a timing t3 of FIG. 5B.

When the liquid film is formed at the inner surface (heating surface) of the heating device 12, the working fluid is instantly heated and vaporized, as shown at a timing t4 of FIG. 5B, and the liquid surface of the working fluid 20 is pushed down to the cooling device 13 by expansion of the vaporized steam, as shown at a timing t5 of FIG. 5B. As a result, the piston 14 of the generator 1 is lifted up corresponding to the downward movement of the working fluid 20 at the heating device 12, as shown at timings t5 and t6 of FIG. 5B.

The vaporized steam will be then cooled and condensed when the liquid surface of the working fluid 20 comes down to the cooling device 13, as shown at a timing t7 of FIG. 5B, and the piston 14 is moved down as well. The liquid surface opposing to the inert gas 22 returns to its initial position, as shown at the timing t1 of FIG. 5B.

The driving circuit 34 controls the displacer 30 in accordance with a detected signal from a position sensor 32 for the position of the movable element 2 of the generator 1 (namely the position of the piston 14), to effectively operate the steam engine and thereby to periodically move the piston 14 up and down. Namely, the driving circuit 34 outputs a pulse signal to the displacer 30 at the timing t2, which is shortly before the piston 14 moves to its bottom dead point at the timing t3, as shown in FIG. 5A, so that the liquid film is formed at the heating surface of the heating device 12.

Accordingly, the vaporized steam is produced by the heating device 12 and the pressure of the working fluid 20 is increased shortly before the piston 14 reaches the bottom dead point. And therefore, the piston 14 is smoothly lifted up again in accordance with the increase of the pressure of the working fluid in the heating device 12. As above, according to the steam engine 10 of the embodiment, the piston 14 of the generator 1 can be also effectively moved up and down, and the electric power can be generated at the generator 1.

According to the steam engine 10 of the embodiment, since the displacer 30 is actuated at such timing, at which the steam is to be produced by the heating device 12 by forming the liquid film at the heating surface and heating the liquid film by the heating device 12, all of the liquid film formed at the heating surface can be vaporized, without setting the inner diameter of the through-holes 12a within a certain range (in terms of the depth of heat penetration "δ") as described in relation to the first embodiment.

Accordingly, the liquid-phase fluid which would unnecessarily carry the heat from the heating device 12 to the cooling device 13 can be minimized.

As a result, even with the second embodiment, heat loss caused by the working fluid 20, which has not been vaporized at the heating device 12, can be reduced and the steam engine having a high efficiency can be realized, as in the same manner to the first embodiment.

(Other Embodiments)

Although the present invention is explained with reference to the first and second embodiments, the present invention shall not be limited to those embodiments and many other modifications can be possible.

For example, the heating device 12 of the second embodiment can be made of metal, such as copper, aluminum and the like having a high heat conductivity. The heating device 12 can be further made of sintered metal of copper, because the working fluid is formed as the liquid film on the heating surface of the heating device 12 to vaporize and to produce the vaporized steam according to the second embodiment. And therefore, it is preferable that a larger amount of the working fluid is caught by the heating surface of the heating device. Since the sintered metal has a porous surface, the larger amount of the working fluid can be caught by the heating surface. As a result, the heating device 12 as well as the steam engine 10 can be made in a small sized structure.

Furthermore, according to the second embodiment, the position of the piston 14 is detected to effectively operate the movable element 30a of the displacer 30. A pressure sensor for detecting the pressure of the working fluid in the fluid container 11 can be replaced with the position sensor 32.

As explained with reference to FIG. 5A, since the position change of the piston 14 and the pressure change of the working fluid 20 are correlated, the same effect to the second embodiment can be obtained by operating the displacer 30 in accordance with the pressure change of the working fluid 20.

Figure 6:
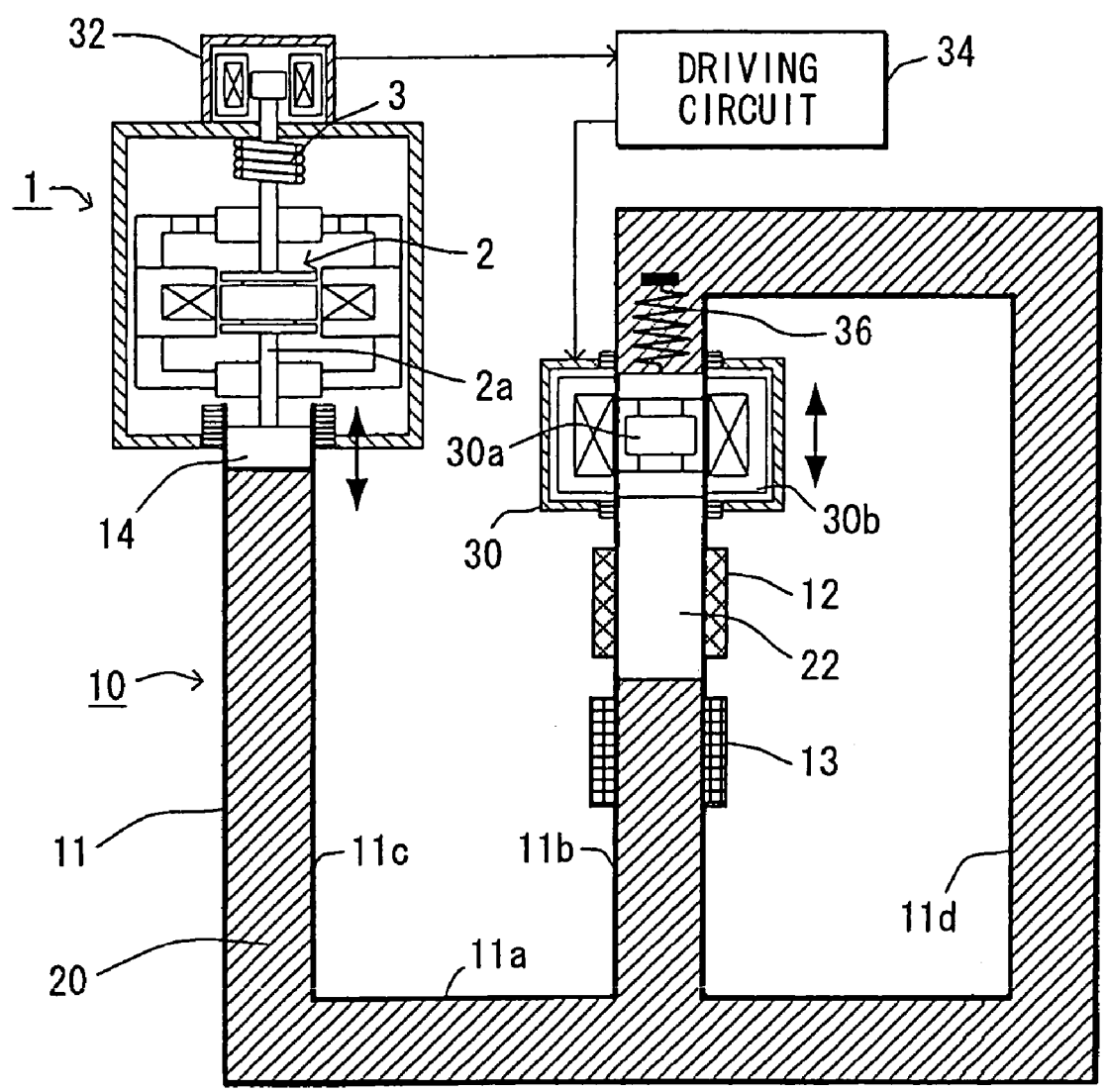
FIG. 6 is a schematic view showing a steam engine according to a further modified embodiment of the present invention.

The displacer 30 of the second embodiment comprises the movable element 30a and the actuator 30b. As a modification of the second embodiment, a spring 36 can be provided in the displacer 30 for urging the movable element 30a toward the heating device 12, as shown in FIG. 6.

In such a modified embodiment, the movable element 30a of the displacer 30 can be sympathetically vibrated at a resonant frequency determined by a spring constant of the spring 36 and the weight of the movable element 30a, and thereby the driving energy for the movable element 30a can be reduced.

In the above embodiments, the steam engine 10 of the present invention is applied to a driving unit for the electric power generator 1. However, the steam engine of the present invention can be used as the driving unit for the other purposes than the electric power generation.

What is claimed is:

1. A steam engine comprising:
   a fluid container in which working fluid is filled and the working fluid can move;
   a heating device for heating the working fluid in the fluid container and vaporizing the working fluid, the heating device having a flow passage formed by a heating surface and the working fluid flowing through the flow passage; and
   a cooling device for cooling down and liquidizing the steam vaporized by the heating device,
   wherein kinetic energy is generated by periodically moving the working fluid in the fluid container by heating and cooling the working fluid by the heating device and the cooling device,
   wherein a diameter of the flow passage is made almost equal to or smaller than a depth of heat penetration (δ), which is determined by the following mathematical formula:

$$\delta = \sqrt{2a/\omega}$$

wherein "a" is a heat diffusivity of the working fluid, and "ω" is an angular frequency of the working fluid during the working fluid is periodically moved back and forth.

2. A steam engine according to claim 1, wherein the flow passage comprises multiple through-holes, each diameter of which is made almost equal to or smaller than a depth of heat penetration (δ).

3. A steam engine according to claim 1, wherein the heating device is arranged at a position vertically higher than the cooling device.

4. A steam engine according to claim 1, further comprising:
   a vibration generating means for periodically applying a vibrating force to the working fluid in response to the heating and cooling thereof.

5. A steam engine according to claim 4, wherein the vibration generating means is a gas filled in the fluid container for applying the vibrating force by its compressive reacting force.

6. A steam engine according to claim 1, wherein the fluid container comprises:
   a U-shaped pipe portion having a bent pipe portion and a pair of vertically extending straight portions extending from the bent pipe portion,
   wherein the bent pipe portion is arranged at a lower most position of the U-shaped pipe portion,
   wherein the heating device and the cooling device are provided at one of the straight pipe portion, and
   wherein the working fluid moves back and forth through the bent pipe portion in response to the heating and cooling operation of the heating and cooling devices.

7. A steam engine comprising:
   a circular fluid container in which working fluid is filled and the working fluid can move;
   a heating device for heating the working fluid in the fluid container and vaporizing the working fluid;
   a cooling device provided at a vertically lower position than the heating device and for cooling down and liquidizing the steam vaporized by the heating device,
   wherein kinetic energy is generated by periodically moving the working fluid in the fluid container by heating and cooling the working fluid by the heating device and the cooling device;

a displacer provided at the fluid container at a position vertically higher than the heating device;

a gas filled in a part of the fluid container between the heating device and the displacer so that a liquid surface of the liquid-phase working fluid is formed at a position between the heating device and the cooling device; and a driving means for driving the displacer in a synchronized manner with the periodical movement of the working fluid, to temporally move the liquid surface of the working fluid in an upward direction so that liquid film of the working fluid is formed at a heating surface of the heating device.

8. A steam engine according to claim 7, wherein the heating device is made of sintered metal.

9. A steam engine according to claim 7, wherein the displacer comprises;

a movable element for closing a fluid passage of the fluid container;

an actuator for moving the movable element along the fluid passage; and a spring for urging the movable element toward the heating device.

\* \* \* \* \*